United States Patent
Li et al.

(10) Patent No.: US 9,704,654 B2
(45) Date of Patent: Jul. 11, 2017

(54) MULTI-LAYER BASED NEW CONCEPTUAL BATTERY TYPE SUPERCAPACITOR WITH HIGH POWER DENSITY AND HIGH ENERGY DENSITY AND METHOD FOR PREPARING THE SAME

(71) Applicant: SOUTHWEST UNIVERSITY, Bei Bei District, Chongqing (CN)

(72) Inventors: Chang Ming Li, Chongqing (CN); Ping Ping Yang, Chongqing (CN); Jia Le Xie, Chongqing (CN)

(73) Assignee: SOUTHWEST UNIVERSITY, Bei Bei District, Chongqing (CN)

( * ) Notice: Subject to any disclaimer, the term of this patent is extended or adjusted under 35 U.S.C. 154(b) by 35 days.

(21) Appl. No.: 14/623,279

(22) Filed: Feb. 16, 2015

(65) Prior Publication Data
US 2016/0086740 A1    Mar. 24, 2016

Related U.S. Application Data

(63) Continuation-in-part of application No. 14/494,713, filed on Sep. 24, 2014, now abandoned.

(30) Foreign Application Priority Data

Oct. 31, 2014  (CN) .......................... 2014 1 0604198

(51) Int. Cl.
*H01G 11/26* (2013.01)
*H01G 11/46* (2013.01)
(Continued)

(52) U.S. Cl.
CPC ............... *H01G 11/26* (2013.01); *C25D 9/08* (2013.01); *C25D 13/02* (2013.01); *H01G 11/36* (2013.01);
(Continued)

(58) Field of Classification Search
CPC ........ H01G 11/26; H01G 11/46; H01G 11/48; H01G 11/36; H01G 11/24; H01G 11/86
(Continued)

(56) References Cited

U.S. PATENT DOCUMENTS

| | | | |
|---|---|---|---|
| 2013/0216894 A1* | 8/2013 | Wang | H01M 4/13 429/158 |
| 2014/0212760 A1* | 7/2014 | Zhao | H01M 4/0419 429/231.8 |
| 2014/0234680 A1* | 8/2014 | Yoon | H01G 11/36 429/94 |

* cited by examiner

*Primary Examiner* — Eric Thomas
*Assistant Examiner* — Michael P McFadden
(74) *Attorney, Agent, or Firm* — Merchant & Gould P.C.

(57) ABSTRACT

Supercapacitor is an energy storage device with high power density and low energy density, and is normally used with a battery to satisfy one's needs for high power density and high energy density. The present invention provides a method to fabricate a novel battery type supercapacitor, with a multi-layered structure composed of a plurality of thin layers which is formed by alternately stacking high specific energy battery material and/or supercapacitor material such as metal oxides, metal hydroxides, metal sulfides, conductive polymers, carbon materials with reduced graphene oxide (rGO), to obtain a supercapacitor with both high specific energy density and high specific power density. Such a novel multi-layered structure composed of a plurality of thin layers formed by alternately stacking battery or capacitor material and rGO can not only ensure the obtained electrode to greatly improve the diffusion control of reaction particles, but also enhance its kinetic characteristic, so as to achieve both high power density and high energy density when used as a capacitor.

9 Claims, 7 Drawing Sheets

(51) Int. Cl.
*H01G 11/48* (2013.01)
*H01G 11/36* (2013.01)
*H01G 11/86* (2013.01)
*C25D 9/08* (2006.01)
*C25D 13/02* (2006.01)

(52) U.S. Cl.
CPC ............. *H01G 11/86* (2013.01); *H01G 11/48* (2013.01); *Y02E 60/13* (2013.01)

(58) Field of Classification Search
USPC .............................................. 361/502; 3/502
See application file for complete search history.

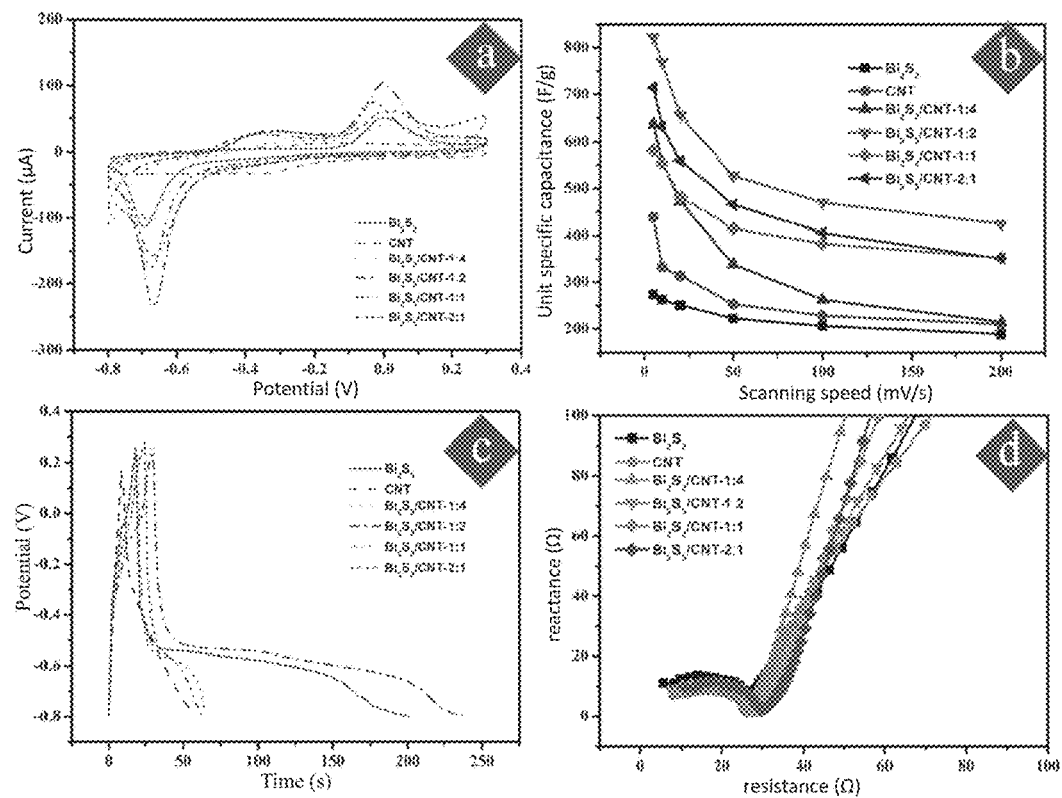
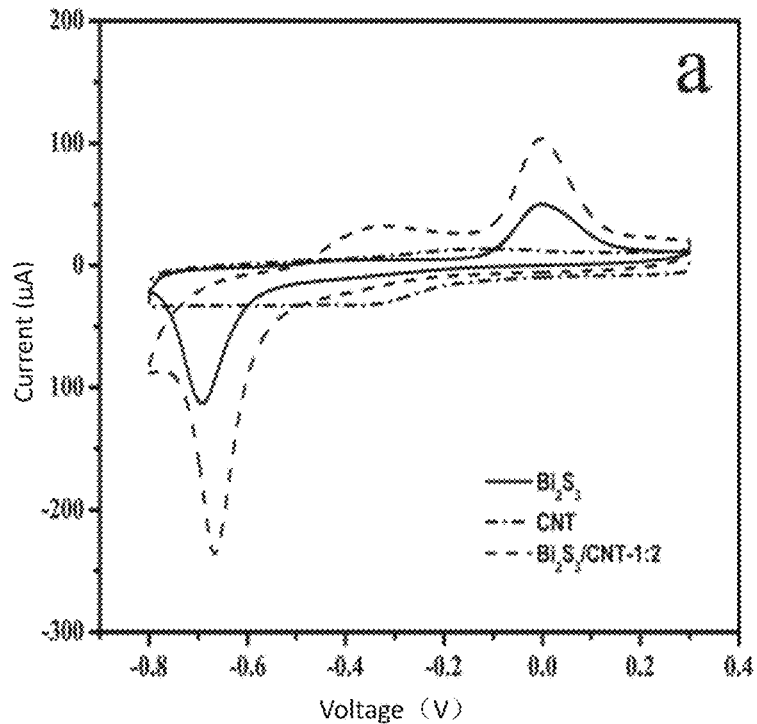
Fig. 5
Fig. 6 a b c

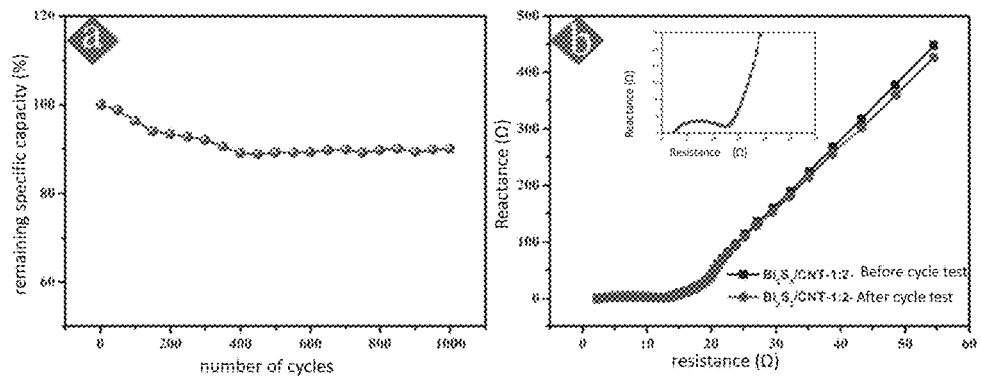
Fig. 7
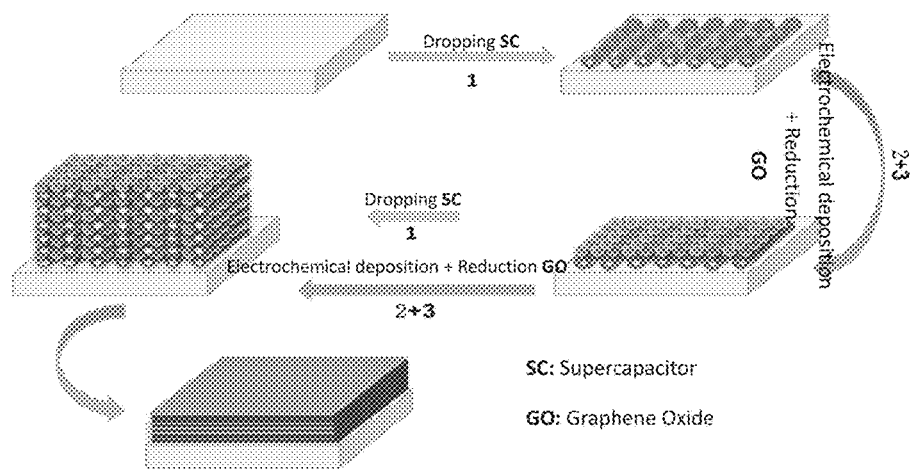
Fig. 8
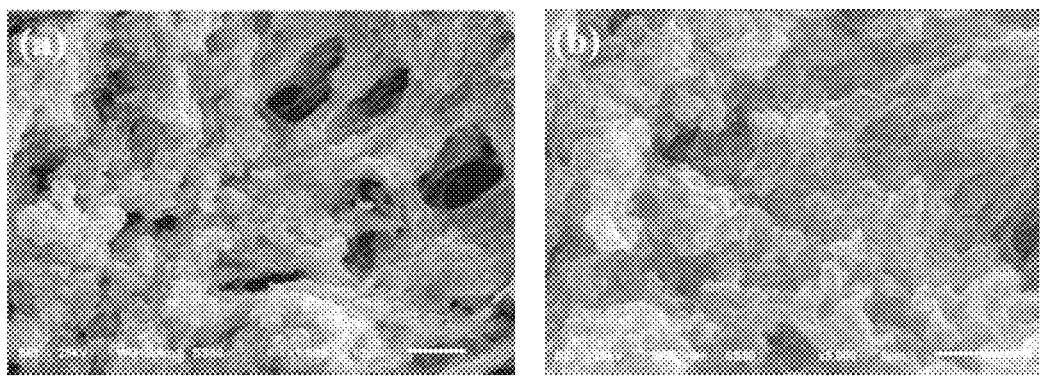
Fig. 9a                    Fig. 9b

MULTI-LAYER BASED NEW CONCEPTUAL BATTERY TYPE SUPERCAPACITOR WITH HIGH POWER DENSITY AND HIGH ENERGY DENSITY AND METHOD FOR PREPARING THE SAME

This application is a Continuation-in-Part of U.S. Ser. No. 14/494,713 filed 24 Sep. 2014, and claims benefit of Serial No. 201410604198.4, filed 31 Oct. 2014 in China and which applications are incorporated herein by reference. A claim of priority is made to each of the above disclosed applications.

TECHNICAL FIELD

The present invention relates to capacitor parts field, and relates to a battery type capacitor. In particular, the present invention relates to a new conceptual battery type supercapacitor electrode with both high power density and high energy density.

BACKGROUND

Supercapacitor, is also called electrochemical capacitor, has much higher energy density than conventional capacitor but is still lower than batteries. The charge storage of supercapacitor mainly depends on the electrochemical reaction or the electrical double-layer on the electrode surface, and it possesses advantages of rapid charging-discharging, long cycle life, good stability, widely range of operation temperature, simple circuit, reliability, and environmental friendly. Currently, supercapacitors have been commercially available for wide applications, e.g., personal consumer electronics, electric vehicles, flexible electronic display and aerospace, etc. However, the energy density of the existing supercapacitor is still much lower than battery (e.g., lithium battery). On the contrary, battery (e.g., lithium ion battery) possesses higher energy density but low power density, which requires a long time to charge/discharge, and has safety risks.

Therefore, it's essential to develop a novel supercapacitor with both high energy density and high power density to substantially solve the serious problems in important applications such as electric vehicles which require both high energy density and power density and short charge time for the energy storage and conversion devices. No matter whether it is the battery or the supercapacitor, the key to improve its energy density and power density is to choose proper electrode material and electrode structure. The components and micro nanostructure of the electrode material are decisive factors for energy conversion and storage.

Currently, the electrode material of the supercapacitor mainly uses carbon with high specific surface and/or electrochemically active materials such as metal oxides and conductive polymers. In addition, some metal hydroxides, metal sulfides and mixed metal oxides are also used as the electrode material of the supercapacitor. Although these materials exhibit superior specific capacitance (i.e., charge storage capacity) and high energy density, their power density is poor, and their energy density is low under high charge-discharge rate.

In view that no prior art has ever disclosed a battery or a capacitor that possesses both high power density and high energy density and has both battery and capacitor characteristics, there is a need to develop a completely novel conceptual battery type supercapacitor, which will become a comprehensive environmental friendly energy storage device with both high energy density and high power density, to fundamentally solve the deficiency of the currently used portable energy storage/energy conversion device, and to reform the existing commercial energy devices.

SUMMARY

In view of above, one objective of the present invention is to provide a multi-layer based new conceptual battery type supercapacitor with high power density and high energy density.

In order to achieve the above objective, the present invention provides:

A multi-layer based new conceptual battery type supercapacitor with high power density and high energy density, comprising a multi-layer-structured electrode, an electrolyte, a current collector or named as substrate and a housing. The multi-layer-structured electrode is formed by alternately stacking or laminating thin layers of high specific energy battery material and/or supercapacitor material and reduced graphene oxide film.

Preferably, the multi-layer-structured electrode is made from electrochemical deposition, dropping, spin coating, screen printing, dip coating or brush coating.

Preferably, the high specific energy battery material and/or supercapacitor material is metal oxide, metal hydroxide, metal sulfide, conductive polymer or carbon material.

Preferably, the metal oxide are one or more of manganese oxide, cobalt oxide, iron oxide, ruthenium oxide, molybdenum oxide, tungsten oxide, titanium oxide, manganese molybdenum oxide, cobalt molybdenum oxide, nickel cobalt oxide, cobalt manganese oxide, and vanadium phosphate oxide. The metal hydroxide are one or more of cobalt hydroxide, nickel hydroxide, and manganese hydroxide. The metal sulfide are one or more of bismuth sulfide, molybdenum sulfide, nickel sulfide, iron sulfide, tin sulfide, cadmium sulfide, lead sulfide, and gallium sulfide. The conductive polymer are one or more of polypyrrole, polyaniline, poly-3,4-ethylene dioxythiophene or polythiophene. The carbon material are graphene, graphene hydrosol, graphene aerosol, three dimensional graphene, carbon nanotube, activated carbon, biomass carbon or carbon cloth.

Preferably, the substrate (current collector) to support the supercapacitor multi-layer-structures electrode for current collecting is carbon cloth, carbon mesh, metal or/and metal oxide film, metal or/and metal oxide mesh and conducting layer-coated plastic or organic or polymer film, etc.

Preferably, the electrolyte used in the supercapacitor is an aqueous electrolyte including acidic, alkaline and neutral ones, a non-aqueous electrolyte, a gel- or polymer-electrolyte and a solid electrolyte.

Preferably, the high specific energy battery material and/or the supercapacitor material is $Bi_2S_3$ and CNT, and the multi-layer-structured electrode is a multi-layered ($Bi_2S_3$/CNT)/rGO electrode.

Preferably, $Bi_2S_3$/CNT layers and rGO layers are alternately stacked or laminated in the multi-layered ($Bi_2S_3$/CNT)/rGO electrode, and the layer number of both $Bi_2S_3$/CNT layers and rGO layers are 2-20.

Preferably, the layer thickness of both $Bi_2S_3$/CNT layer and rGO layer are 2-500 nm.

The present invention further discloses a method for preparing the multi-layer based new conceptual battery type supercapacitor with high power density and high energy density, comprising the following steps:

1) coating $Bi_2S_3$/CNT on a substrate and drying;
2) electrochemical depositing graphene oxide onto the $Bi_2S_3$/CNT film obtained in step 1) in a graphene oxide solution;

3) reducing graphene oxide adsorbed on the $Bi_2S_3$/CNT film in step 2) to rGO with cyclic voltammetry in a KCl solution, and then taking out and drying;

4) repeating steps 1)-3) several times to obtain a multi-thin layered supercapacitor electrode;

5) assembling the supercapacitor by using the supercapacitor electrodes obtained in step 4).

Preferably, the method further includes a step of preparing $Bi_2S_3$/CNT before coating $Bi_2S_3$/CNT, comprising: firstly, weighing $Bi(NO_3)_3 \cdot 5H_2O$, thioacetamide and CNT; then dissolving the above materials in the water; and, finally, placing the solution under 160-200° C. to react for 5-8 h to obtain $Bi_2S_3$/CNT nanocomposite.

Preferably, when coating $Bi_2S_3$/CNT on the substrate in step 1), $Bi_2S_3$/CNT is firstly dissolved in Nafion ethanol solution; then, the Nafion ethanol solution containing $Bi_2S_3$/CNT is dropped onto the surface of a substrate; wherein, the mass concentration of $Bi_2S_3$/CNT is 0.05-0.15 mg/mL, and the volume ratio of Nafion and ethanol is 1:10-1:50.

Preferably, in electrochemical deposition of step 2), $Bi_2S_3$/CNT film obtained in step 1) is used as a working electrode, a platinum electrode is used as counter electrode, a saturated calomel electrode is used as reference electrode, and graphene oxide solution is electrolyte.

Preferably, potentiostatic method with a deposition potential of 2.0-3.0 V and a deposition time of 50-100 s is utilized to deposit graphene oxide, and the concentration of graphene oxide is 0.3-0.8 mg/mL.

Preferably, when reducing graphene oxide with cyclic voltammetry in step 3), the scan rate is 40-60 mV/s, the potential window is $-1.1 \sim -0.2$ V and the cycling number is 2-5 cycles.

Technical Effects:

The supercapacitor of the present invention possesses a multi-layered structure by alternately stacking or laminating high specific energy battery material and/or supercapacitor material with reduced graphene oxide, and use the multi-layered structure as the electrode of the supercapacitor, so as to form a new conceptual battery type supercapacitor with both high power density and high energy density, which not only overcomes the low energy density of the conventional and the currently available supercapacitors but also eliminates using a battery to meet the needs of high power density and high energy density. Further, the charging time will be significantly reduced in comparison to the batteries.

The method for preparing a battery-type supercapacitor of the present invention creatively combines the battery type material $Bi_2S_3$/CNT with capacitance material rGO alternately. The achieved supercapacitor exhibits high energy density (460 Wh/kg), high power density (22802 W/kg), extremely high specific capacitance (3568 F/g at a current density of 22 A/g) and excellent cycling stability (90% retention of initial capacity after $1000^{th}$ cycle). It can satisfy the needs of daily consumer electronic products, flexile instruments, electric vehicles and large equipment. It possesses extremely high academic and commercial values.

BRIEF DESCRIPTION OF THE DRAWINGS

In order to clearly present the objectives, the technical solutions and the technical effects of the present invention, illustrations are given in connection with the accompanying drawings:

FIG. 1 is the scanning electron microscope (SEM) images of the raw material or the semi-finished product for preparing the electrode; in which:

a-c show the low magnification SEM images of carbon nanotube (CNT);

d-f show the low magnification SEM images of $Bi_2S_3$;

g-i show the low magnification SEM images of $Bi_2S_3$/CNT nanocomposite obtained in accordance with Example 1.

Figure 2:
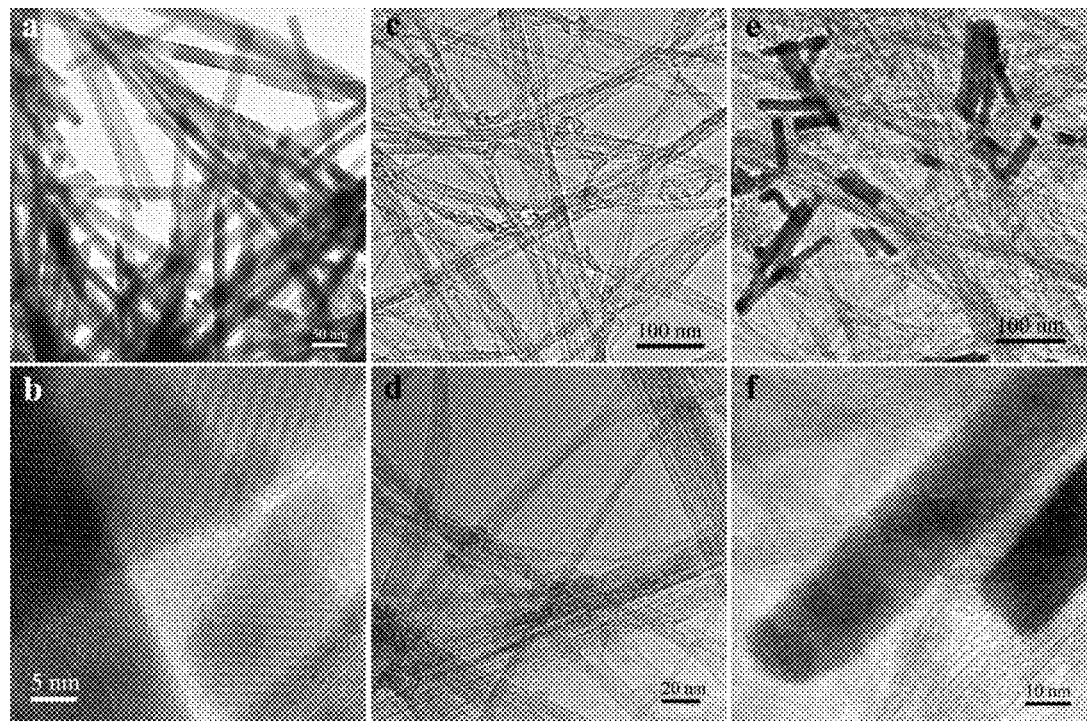

FIG. 2 is the transmission electron microscope (TEM) images of the raw material or semi-finished product for preparing the electrode; in which:

a and b respectively show the low magnification TEM image and atomic resolution image of $Bi_2S_3$;

c and d show the TEM images of CNT;

e and f show the TEM images of $Bi_2S_3$/CNT nanocomposite obtained in Example 1 at different magnification.

Figure 3:
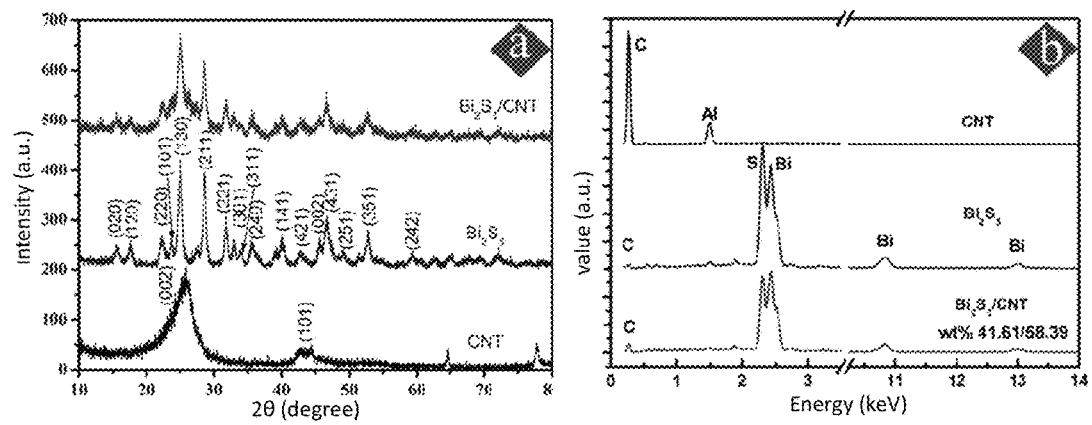

FIG. 3 shows the crystal structure and composition analysis chart of the raw material or the semi-finished product for preparing the electrode; in which:

a shows the X-ray diffraction (XRD) pattern of CNT, $Bi_2S_3$, and $Bi_2S_3$/CNT nanocomposite obtained in Example 1;

b shows the energy dispersive spectroscopy (EDS) of CNT, $Bi_2S_3$, and $Bi_2S_3$/CNT nanocomposite obtained in Example 1.

Figure 4:
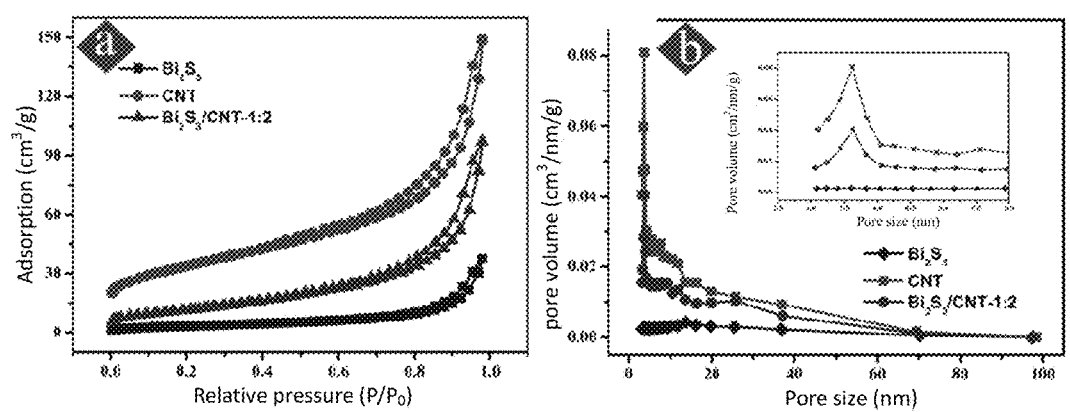

FIG. 4 shows the structural characteristics of the raw material or the semi-finished product for preparing the electrode; in which:

a shows the nitrogen adsorption-desorption isotherms of CNT, $Bi_2S_3$, and $Bi_2S_3$/CNT nanocomposite obtained in Example 1;

b shows the pore size distribution of CNT, $Bi_2S_3$, and $Bi_2S_3$/CNT nanocomposite obtained in Example 1.

FIG. 5 shows the three-electrode system electrochemical characterization of CNT electrode, $Bi_2S_3$ electrode, and $Bi_2S_3$/CNT nanocomposite electrode with various mass ratios; in which:

a shows the cyclic voltammetry curves of CNT electrode, $Bi_2S_3$ electrode, and $Bi_2S_3$/CNT nanocomposite electrode with various mass ratios at 100 mV/s;

b shows the specific capacitance of CNT electrode, $Bi_2S_3$ electrode, and $Bi_2S_3$/CNT nanocomposite electrode with various mass ratios at different scan rate;

c shows the charging-discharging curves of CNT electrode, $Bi_2S_3$ electrode, and $Bi_2S_3$/CNT nanocomposite electrode with different mass ratios at 10 A/g;

d shows the AC impedance spectroscopy of CNT electrode, $Bi_2S_3$ electrode, and $Bi_2S_3$/CNT nanocomposite electrode with different mass ratios.

Figure 6:
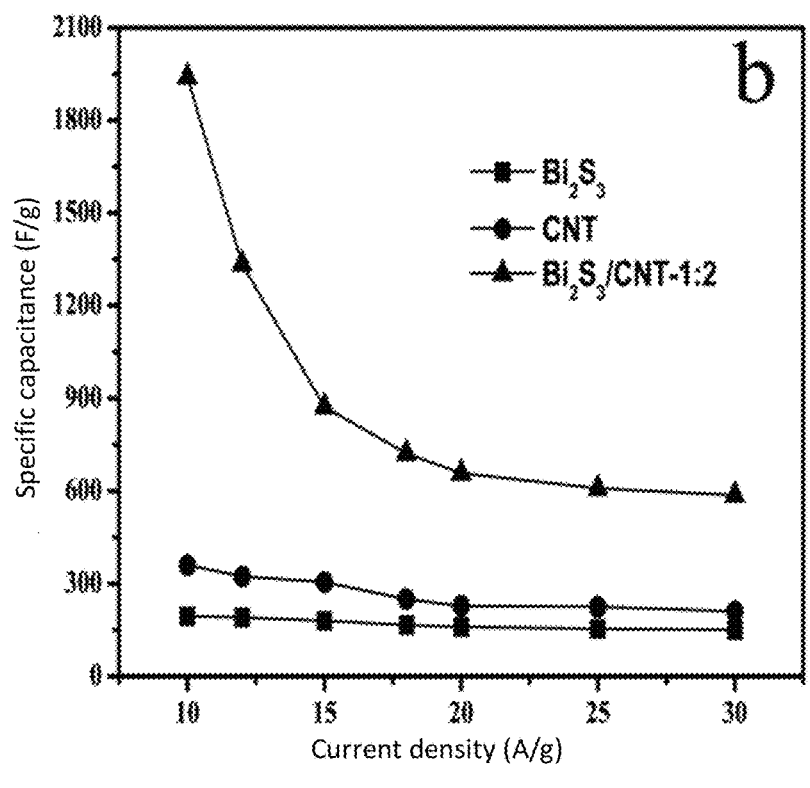
Figure 6:
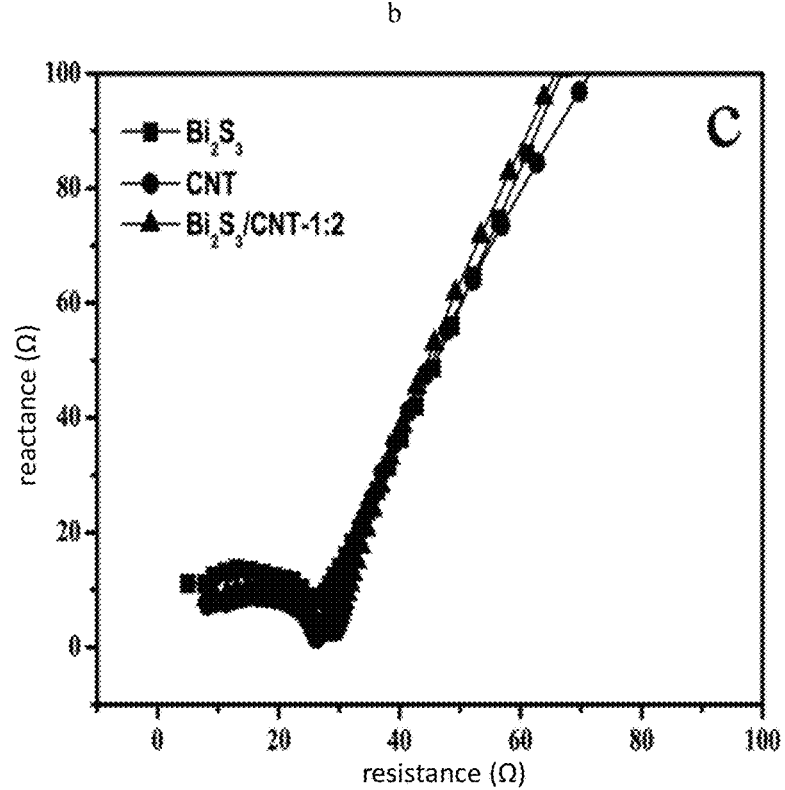

FIG. 6 shows the three-electrode system electrochemical characterization of $Bi_2S_3$ electrode, CNT electrode, and $Bi_2S_3$/CNT nanocomposite electrode obtained in Example 1; in which:

a shows the cyclic voltammetry curves of CNT electrode, $Bi_2S_3$ electrode, and $Bi_2S_3$/CNT capacitor electrode of Example 1 at 100 mV/s;

b shows the specific capacitance of CNT electrode, $Bi_2S_3$ electrode, and $Bi_2S_3$/CNT capacitor electrode of Example 1 under various current densities;

c shows the AC impedance spectroscopy of CNT electrode, $Bi_2S_3$ electrode, and $Bi_2S_3$/CNT capacitor electrode of Example 1.

FIG. 7 shows electrochemical characterization for a supercapacitor device, a two-electrode system of $Bi_2S_3$/CNT nanocomposite electrodes obtained in Example 1; in which:

a shows the specific capacity retention diagram of $Bi_2S_3$/CNT nanocomposite electrode of Example 1 for charging-discharging 1000 cycles;

b shows the AC impedance spectroscopy of $Bi_2S_3$/CNT nanocomposite electrode of Example 1 before and after 1000 cycles; in which the illustration (inserted chart) shows an enlarged chart of AC impedance spectroscopy in high frequency region.

Figure 9:
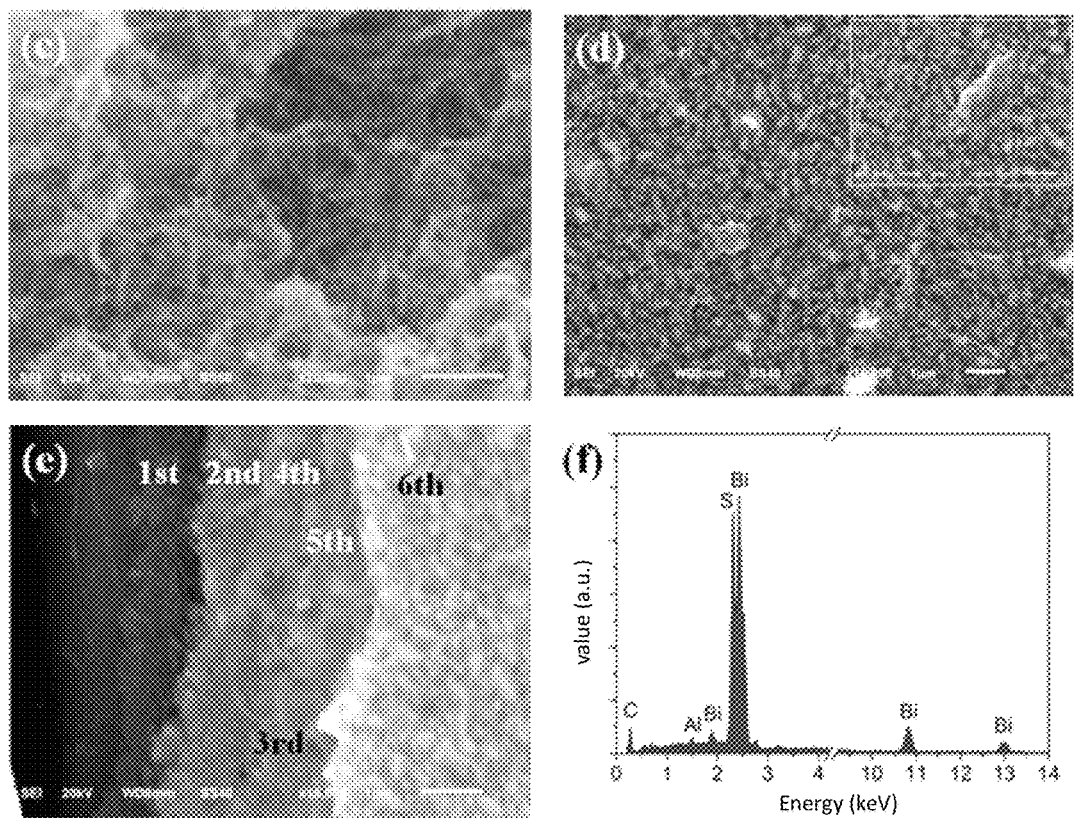

FIG. 8 shows the schematic diagram of preparing a multi-layered ($Bi_2S_3$/CNT)/rGO capacitor electrode;

FIG. 9 shows the SEM images of $Bi_2S_3$/CNT nanocomposite electrode and multi-layered ($Bi_2S_3$/CNT)/rGO capacitor electrode of Example 1; in which:

a-c show the SEM images of $Bi_2S_3$/CNT nanocomposite electrode under different magnification;

d shows the SEM image of multi-layered ($Bi_2S_3$/CNT)/rGO capacitor electrode; in which the illustration (inserted chart) shows the partial enlarged SEM view;

e shows the SEM image of the cross-section of multi-layered ($Bi_2S_3$/CNT)/rGO capacitor electrode;

f shows the EDS spectrum of $Bi_2S_3$/CNT nanocomposite electrode.

Figure 10:
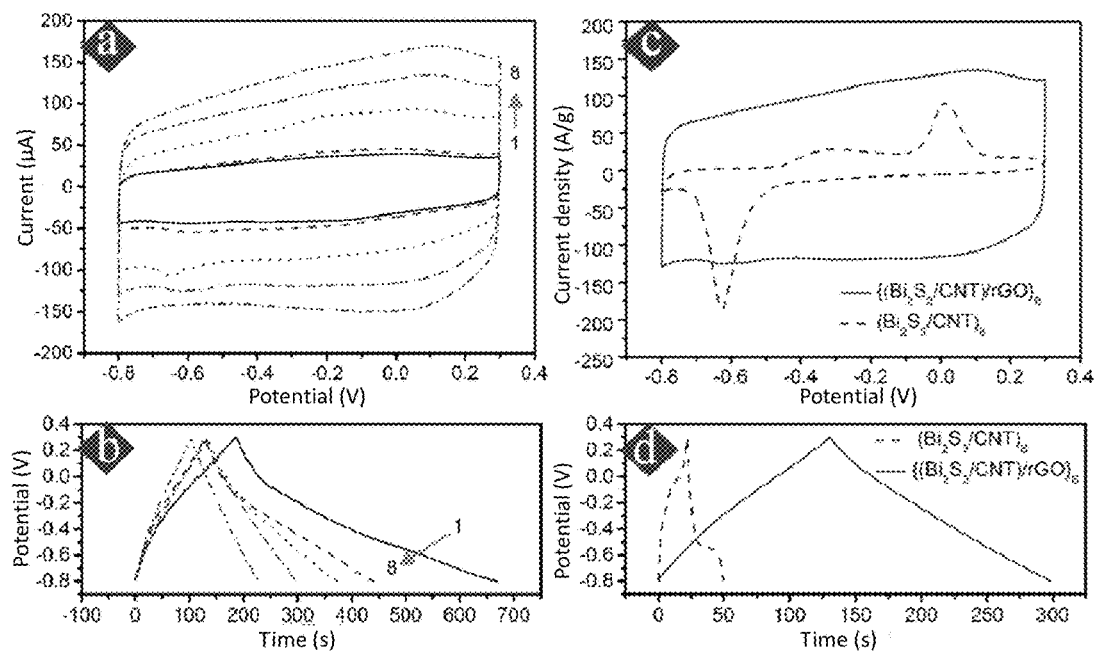

FIG. 10 shows the three-electrode system electrochemical characterization of ($Bi_2S_3$/CNT)/rGO capacitor electrode with different layer number in Examples 1-5 and six-layered $Bi_2S_3$/CNT nanocomposite electrode in comparative Example 5; in which:

a shows the cyclic voltammetry curves of ($Bi_2S_3$/CNT)/rGO capacitor electrode with one, two, four, six and eight layer(s) at a scan rate of 50 mV/s;

b shows the charging-discharging curves of ($Bi_2S_3$/CNT)/rGO capacitor electrode with one, two, four, six and eight layer(s) at a current density of 22 A/g;

c shows the cyclic voltammetry curves of six-layered ($Bi_2S_3$/CNT)/rGO capacitor electrode and six-layered $Bi_2S_3$/CNT nanocomposite electrode at a scan rate of 50 mV/s;

d shows the charging-discharging curves of six-layered ($Bi_2S_3$/CNT)/rGO capacitor electrode and six-layered $Bi_2S_3$/CNT nanocomposite electrode at a current density of 22 A/g.

Figure 11:
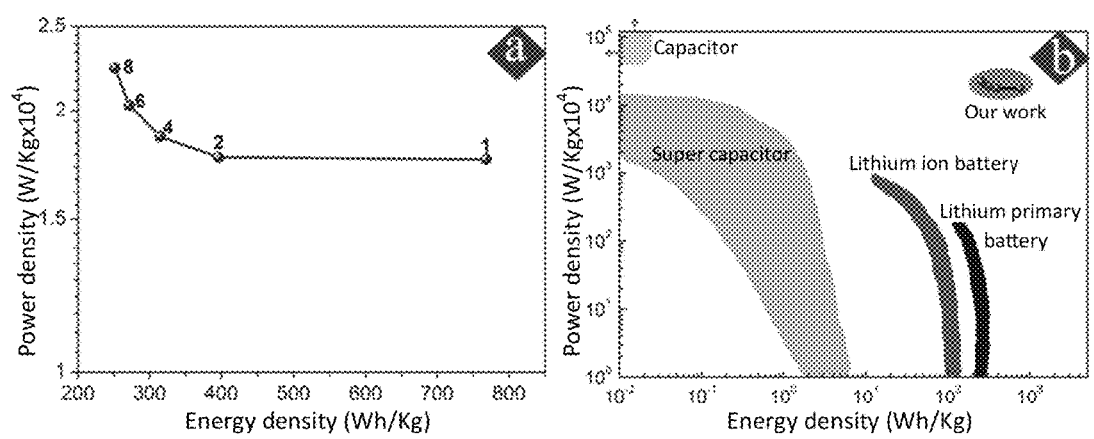

FIG. 11 shows the comparison of power density and energy density of multi-layered ($Bi_2S_3$/CNT)/rGO capacitor electrode, in which:

a shows the power density-energy density diagram of ($Bi_2S_3$/CNT)/rGO capacitor electrode with one, two, four, six, and eight layer(s);

b shows the comparison of power density and energy density between ($Bi_2S_3$/CNT)/rGO capacitor electrode with one, two, four, six, and eight layer(s) and existing energy storage device.

DETAILED DESCRIPTION

Detailed description will be given below to the preferred embodiments in connection with the drawings in detail. It is noted that ingredient parts herein all refer to mass.

The following embodiments disclose a multi-layer based new conceptual battery type supercapacitor with high power density and high energy density, comprising: a multi-layer-structured electrode, an electrolyte, a current collector or named as substrate and a housing. The multi-layer-structured electrode is formed by alternately stacking or laminating thin layers of high specific energy battery material and/or supercapacitor material and reduced graphene oxide film.

The multi-layer-structured electrode is prepared by electrochemical deposition, dropping, spin coating, screen printing, dip coating or brush coating. The high specific energy battery material and/or the supercapacitor material is preferably metal oxide, metal hydroxide, metal sulfide, conductive polymer or carbon material.

Further, the metal oxide can be manganese oxide, cobalt oxide, iron oxide, ruthenium oxide, molybdenum oxide, tungsten oxide, titanium oxide, manganese molybdenum oxide, cobalt molybdenum oxide, nickel cobalt oxide, cobalt manganese oxide, and vanadium phosphate oxide. The metal hydroxide can be cobalt hydroxide, nickel hydroxide, and manganese hydroxide. The metal sulfide can be bismuth sulfide, molybdenum sulfide, nickel sulfide, iron sulfide, tin sulfide, cadmium sulfide, lead sulfide, and gallium sulfide. The conductive polymer can be polypyrrole, polyaniline, poly-3,4-ethylene dioxythiophene or polythiophene. The carbon material can be graphene, graphene hydrosol, graphene aerosol, three dimensional graphene, carbon nanotube, activated carbon, biomass carbon or carbon cloth.

The substrate (current collector) to support the supercapacitor multi-layer-structured electrode for current collecting is carbon cloth, carbon mesh, metal or/and metal oxide film, metal or/and metal oxide mesh and conducting layer-coated plastic or organic or polymer film, etc. The electrolyte used in the supercapacitor is an aqueous electrolyte including acidic, alkaline and neutral ones, a non-aqueous electrolyte, a gel- or polymer-electrolyte and a solid electrolyte.

In particular, the high specific energy battery material and/or supercapacitor material are chosen to be $Bi_2S_3$ and CNT. The multi-layer-structured electrode is multi-layered ($Bi_2S_3$/CNT)/rGO electrode.

The $Bi_2S_3$/CNT layers and rGO layers are alternately stacked or laminated in the multi-layered ($Bi_2S_3$/CNT)/rGO electrode, and the layer number of both $Bi_2S_3$/CNT layers and rGO layers are 2-20.

Further, the layer thickness of both $Bi_2S_3$/CNT layer and rGO layer are 2-500 nm.

The following embodiments further disclose a method for preparing a multi-layer based new conceptual battery type supercapacitor with high power density and high energy density, comprising the following steps:

1) coating $Bi_2S_3$/CNT on a substrate and drying;

2) electrochemical depositing graphene oxide onto the $Bi_2S_3$/CNT layer obtained in step 1) in a graphene oxide solution;

3) reducing the graphene oxide adsorbed on the $Bi_2S_3$/CNT film in step 2) to rGO with cyclic voltammetry in a KCl solution, and then taking out and drying;

4) repeating steps 1)-3) several times to obtain a multi-thin layered supercapacitor electrode;

5) assembling the supercapacitor by using the supercapacitor electrodes obtained in step 4).

Preferably, the method further includes a step of preparing $Bi_2S_3$/CNT before coating $Bi_2S_3$/CNT, comprising: firstly, weighing $Bi(NO_3)_3 \cdot 5H_2O$, thioacetamide and CNT; then dissolving the materials in the water; and, finally, placing the solution under 160-200° C. to react for 5-8 h to obtain $Bi_2S_3$/CNT nanocomposite.

Preferably, when coating $Bi_2S_3$/CNT on the substrate in step 1), $Bi_2S_3$/CNT is firstly dissolved in Nafion ethanol solution; then, the Nafion ethanol solution containing $Bi_2S_3$/CNT is dropped onto the surface of a substrate; wherein, the mass concentration of $Bi_2S_3$/CNT is 0.05-0.15 mg/mL, and the volume ratio of Nafion and ethanol is 1:10-1:50.

Preferably, in the electrochemical deposition in step 2), the $Bi_2S_3$/CNT film obtained in step 1) is used as a working electrode, a platinum electrode is used as counter electrode, a saturated calomel electrode is used as reference electrode, and graphene oxide solution is electrolyte.

Preferably, potentiostatic method with a deposition potential of 2.0-3.0 V and a deposition time of 50-100 s is utilized to deposit graphene oxide, and the concentration of graphene oxide is 0.3-0.8 mg/mL.

Preferably, when reducing graphene oxide with cyclic voltammetry in step 3), the scan rate is 40-60 mV/s, the potential window is −1.1~−0.2 V, and the cycling number is 2-5 cycles.

Preferably, the selected conductive substrate in step 1) is glassy carbon electrode; the mass concentration of $Bi_2S_3$/CNT in Nafion ethanol solution is 0.05-0.15 mg/mL, and the volume coating onto the substrate is 3-7 µL.

Example 1

The Example provides a method for preparing a multilayer based new conceptual battery type supercapacitor with high power density and high energy density, comprising the following steps:

1) weighing 0.485 g $Bi(NO_3)_3 \cdot 5H_2O$, 1.5 g thioacetamide and 1.563 g carbon nanotube (CNT) accurately, then dissolving in 15 mL deionized water and stirring continuously for 5 min to obtain a suspension;

2) transferring the suspension from step 1) to 20 mL autoclave, which is then placed in a 180° C. oven for 6 h;

3) allowing the autoclave to cool naturally, washing $Bi_2S_3$/CNT (mass ratio of $Bi_2S_3$/CNT is 1:2) in the autoclave with deionized water and absolute ethyl alcohol for three times respectively, and then drying in the 60° C. oven;

4) dissolving the $Bi_2S_3$/CNT nanocomposite in 5% Nafion ethanol solution and then ultrasonically stirring for 5 min to obtain a 0.1 mg/mL solution;

5) dropping 5 µL $Bi_2S_3$/CNT solution (0.1 mg/mL) on the glassy carbon electrode with a pipette, and then allowing it to dry naturally;

6) using the glassy carbon electrode carried with $Bi_2S_3$/CNT nanocomposite obtained in step 5) as the working electrode, a platinum electrode as the counter electrode, a saturated calomel electrode as the reference electrode, and a 0.5 mg/mL graphene oxide solution as the electrolyte, and then potentiostatic depositing for 70 s under a potential of 2.5 V;

7) changing the electrolyte to saturated KCl, scanning three cycles at a scan rate of 50 mV/s under a potential window of −1.1~−0.2 V to reduce graphene oxide to rGO, and then drying naturally to obtain an electrode with ($Bi_2S_3$/CNT)/rGO film;

8) repeating steps 5)-7) five times on the electrode obtained in step 7) to obtain a battery type supercapacitor electrode with multi-layered ($Bi_2S_3$/CNT)/rGO.

9) assembling supercapacitor with the electrodes obtained from step 8), the electrolyte and housing.

Performance Test

1. The glassy carbon electrode carried with $Bi_2S_3$/CNT nanocomposite obtained in step 5) is used as the working electrode, the platinum electrode as the counter electrode, the saturated calomel electrode as the reference electrode, and a 0.5 mol/L $NaClO_4$ solution as the electrolyte. Electrochemical workstation is used to perform cyclic voltammetry, charging-discharging, AC impedance, and cycle stability evaluation of the $Bi_2S_3$/CNT nanocomposite electrode.

2. The glassy carbon electrode with multilayered ($Bi_2S_3$/CNT)/rGO in step 8) is used as the working electrode, the platinum electrode as the counter electrode, the saturated calomel electrode as the reference electrode, and a 0.5 M $NaClO_4$ solution as the electrolyte. Electrochemical workstation is used to perform cyclic voltammetry, charging-discharging, AC impedance, and cycle stability of the multilayered ($Bi_2S_3$/CNT)/rGO battery type supercapacitor electrode.

Example 2

This Example differs from Example 1 in that: In step 8) of this Example, steps 5)-7) are not repeated.

Example 3

This Example differs from Example 1 in that: In step 8) of this Example, steps 5)-7) are repeated for once.

Example 4

This Example differs from Example 1 in that: In step 8) of this Example, steps 5)-7) are repeated for three times.

Example 5

This Example differs from Example 1 in that: In step 8) of this Example, steps 5)-7) are repeated for five times.

Example 6

This Example differs from Example 1 in that: In step 8) of this Example, steps 5)-7) are repeated for seven times.

Comparative Example 1

This Example provides a method for preparing a multilayer based new conceptual battery type supercapacitor with high power density and high energy density, comprising the following steps:

1) weighing 0.485 g $Bi(NO_3)_3 \cdot 5H_2O$, 1.5 g thioacetamide and 3.126 g CNT accurately, then dissolving $Bi(NO_3)_3 \cdot 5H_2O$, thioacetamide and CNT in 15 mL deionized water and stirring continuously for 5 min to obtain an suspension;

2) transferring the suspension in step 1) to 20 mL autoclave, which is then placed in a 180° C. oven for 6 h;

3) allowing the autoclave to cool naturally, washing $Bi_2S_3$/CNT composite (mass ratio of $Bi_2S_3$/CNT is 1:4) in the autoclave with deionized water and absolute ethyl alcohol for three times respectively, and then drying in the 60° C. oven;

4) dissolving the $Bi_2S_3$/CNT nanocomposite (mass ratio of $Bi_2S_3$/CNT is 1:4) in 5% Nafion ethanol solution and then ultrasonically stirring for 5 min to obtain a 0.1 mg/mL solution;

5) dropping 5 µL $Bi_2S_3$/CNT solution (0.1 mg/mL) from step 4) on the glassy carbon electrode with a pipette, and then allowing it to dry naturally;

6) using the glassy carbon electrode carried with $Bi_2S_3$/CNT nanocomposite obtained in step 5) as the working electrode, a platinum electrode as the counter electrode, a saturated calomel electrode as the reference electrode, and a 0.5 mg/mL graphene oxide solution as the electrolyte, and then potentiostatic depositing for 70 s under a potential of 2.5 V;

7) changing the electrolyte to saturated KCl, scanning three cycles at a scan rate of 50 mV/s under a potential window of −1.1~−0.2 V to reduce graphene oxide absorbed on the surface of electrode in step 6) to rGO, and then drying naturally to obtain an electrode with ($Bi_2S_3$/CNT)/rGO film;

8) repeating steps 5)-7) five times on the electrode obtained in step 7) to obtain a battery type supercapacitor electrode with six-layered ($Bi_2S_3$/CNT)/rGO (each single layer contains a $Bi_2S_3$/CNT layer and a rGO layer).

9) assembling supercapacitor with the supercapacitor electrode obtained from step 8), the electrolyte and the housing.

Comparative Example 2

This Example differs from Comparative Example 1 in that: the mass of carbon nanotube in this Example is 0.781 g, and the mass ratio of $Bi_2S_3$ to CNT of the prepared $Bi_2S_3$/CNT nanocomposite is 1:1.

Comparative Example 3

This Example differs from Comparative Example 1 in that: the mass of carbon nanotube is 0.391 g, and the mass ratio of $Bi_2S_3$ to CNT of the prepared $Bi_2S_3$/CNT nanocomposite is 2:1.

Comparative Example 4

This Example differs from Comparative Example 1 in that: the mass of carbon nanotube is 0.195 g, and the mass ratio of $Bi_2S_3$ to CNT of the prepared $Bi_2S_3$/CNT nanocomposite is 4:1.

Comparative Example 5

This Example differs from Comparative Example 1 in that: the mass of carbon nanotube is 0.000 g, and the pure $Bi_2S_3$ is obtained.

Figure 1:
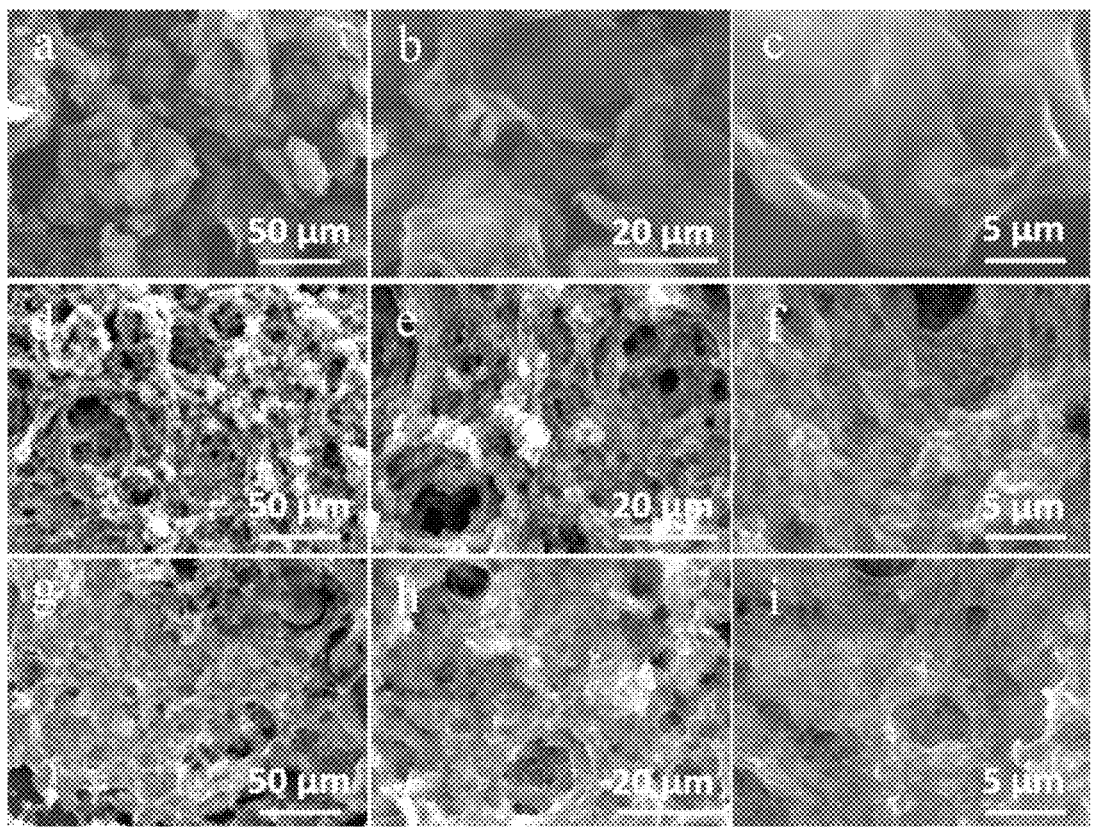

Characterizing the materials and electrodes obtained from the Examples and Comparative Examples, the results are shown in FIGS. 1-11:

FIG. 1 is the scanning electron microscope (SEM) images of the raw material or the semi-finished product for preparing the electrode; in which:
a-c are the low magnification SEM images of carbon nanotube (CNT), indicating that individual CNT is agglomerated easily, and a large number of mesopores and micropores can be observed;
d-f are the low magnification SEM images of $Bi_2S_3$, indicating that pure $Bi_2S_3$ possesses a loose structure with a large number of macropores and mesopores;
g-i show the low magnification SEM images of $Bi_2S_3$/CNT nanocomposite obtained from Example 1, indicating that the nanocomposite has combined the structural properties of the two materials, and pores with various size are observed, which facilitates contact and ion transportation between electrode material and electrolyte.

FIG. 2 is the transmission electron microscope (TEM) images of the raw material or the semi-finished product for preparing the electrode; in which:
a and b respectively show the low magnification TEM image and atomic resolution image of $Bi_2S_3$, indicating that the individual $Bi_2S_3$ is nanorod with a diameter of 20-35 nm, and a $Bi_2S_3$ monocrystal is proved by the atomic resolution image.
c and d show the TEM images of CNT, indicating that individual CNT tends to form network composed of bundled CNT, which is favourable for electron transportation;
e and f show the TEM images of $Bi_2S_3$/CNT nanocomposite obtained in Example 1 at different magnification, indicating that the combination of CNT and $Bi_2S_3$ can cover CNT conductive network on $Bi_2S_3$ nanorod, which is favourable for enhancing the electrochemical activity.

FIG. 3 is the crystal structure and composition analysis chart of the raw material or the semi-finished product for preparing the electrode; in which:
a shows the X-ray diffraction (XRD) pattern of CNT, $Bi_2S_3$ and $Bi_2S_3$/CNT nanocomposite obtained in Example 1, indicating that the synthesized $Bi_2S_3$ is a typical monocrystalline bismuthinite, while the XRD pattern of $Bi_2S_3$/CNT nanocomposite combines the characteristics of $Bi_2S_3$ and CNT, which indicates that $Bi_2S_3$ and CNT are only combined in structure and no chemical reaction is occurred during the synthesis process.
b shows the energy dispersive spectroscopy (EDS) of CNT, $Bi_2S_3$ and $Bi_2S_3$/CNT nanocomposite obtained in Example 1, indicating that the synthesized material does not contain other impurity elements (Al is the main element of the sample stage), and the mass ratio of $Bi_2S_3$ and CNT in $Bi_2S_3$/CNT nanocomposite is 41.61:58.39.

FIG. 4 is the structural characteristics of the raw material or the semi-finished product for preparing the electrode; in which:
a shows the nitrogen adsorption-desorption isotherms of CNT, $Bi_2S_3$ and $Bi_2S_3$/CNT nanocomposite obtained in Example 1, indicating that CNT and $Bi_2S_3$/CNT possess typical mesoporous characteristics, while $Bi_2S_3$ only possesses some pores among nanorods.
b shows the pore size distribution of CNT, $Bi_2S_3$ and $Bi_2S_3$/CNT nanocomposite obtained in Example 1, indicating that CNT possesses micropores, mesopores and large pore volume, $Bi_2S_3$ does not exhibit obvious pore distribution; and $Bi_2S_3$/CNT nanocomposite combines the properties of $Bi_2S_3$ and CNT, exhibiting a relatively broad pore distribution and relatively large pore volume (i.e., surface area), which facilitates ion transportation in the electrolyte.

FIG. 5 is the three-electrode system electrochemical characterization of CNT electrode, $Bi_2S_3$ electrode and $Bi_2S_3$/CNT nanocomposite electrode with various mass ratios; in which:
a shows the cyclic voltammetry curves of CNT electrode, $Bi_2S_3$ electrode and $Bi_2S_3$/CNT nanocomposite electrode with various mass ratios at 100 mV/s. It is obvious that $Bi_2S_3$/CNT with mass ratio of 1:2 exhibits the highest peak current density, i.e., highest electrochemical activity.
b shows the specific capacitance of CNT electrode, $Bi_2S_3$ electrode and $Bi_2S_3$/CNT nanocomposite electrode with various mass ratios at different scan rate, indicating that $Bi_2S_3$/CNT with mass ratio of 1:2 is the most preferred.
c shows the charging-discharging curves of CNT electrode, $Bi_2S_3$ electrode and $Bi_2S_3$/CNT nanocomposite electrode with different mass ratios at 10 A/g. It can be seen that $Bi_2S_3$ and $Bi_2S_3$/CNT exhibit discharge plateaus, which is a typical characteristic of battery-type material. In addition, it also shows that $Bi_2S_3$/CNT with mass ratio of 1:2 is the most preferred.
d shows the AC impedance spectroscopy of CNT electrode, $Bi_2S_3$ electrode and $Bi_2S_3$/CNT nanocomposite electrode with different mass ratios, indicating that $Bi_2S_3$ and CNT can aid in improving the ion diffusion property of the electrode material.

FIG. 6 shows the three-electrode system electrochemical characterization of $Bi_2S_3$ electrode, CNT electrode and $Bi_2S_3$/CNT nanocomposite electrode obtained in Example 1, in which:
a shows the cyclic voltammetry curves of CNT electrode, $Bi_2S_3$ electrode and $Bi_2S_3$/CNT nanocomposite electrode obtained in Example 1 at 100 mV/s, indicating that $Bi_2S_3$/

CNT nanocomposite possesses the characteristics of $Bi_2S_3$ and CNT, which improves both double-layer capacitance and pseudo capacitance.

b shows the specific capacitance of CNT electrode, $Bi_2S_3$ electrode and $Bi_2S_3$/CNT nanocomposite electrode obtained in Example 1 under different current densities, in which $Bi_2S_3$/CNT nanocomposite exhibits good rate capability and high specific capacitance, indicating that $Bi_2S_3$ and CNT have good synergetic effect.

c shows the AC impedance spectroscopy of CNT electrode, $Bi_2S_3$ electrode and $Bi_2S_3$/CNT capacitor electrode obtained in Example 1, in which $Bi_2S_3$/CNT capacitor electrode exhibits relatively low electrochemical resistance, indicating that the composite possesses good electrochemical activity.

FIG. 7 shows electrochemical characterization for a supercapacitor device, a two-electrode system of $Bi_2S_3$/CNT nanocomposite electrodes obtained in Example 1, in which:

a shows the specific capacity retention diagram of $Bi_2S_3$/CNT nanocomposite electrode obtained in Example 1 for charging-discharging 1000 cycles. It exhibits a 90% capacitance retention after $1000^{th}$ cycle, indicating that $Bi_2S_3$/CNT nanocomposite has good cycling stability.

b shows the AC impedance spectroscopy of $Bi_2S_3$/CNT nanocomposite electrode obtained in Example 1 before and after 1000 cycles; in which the illustration (inserted chart) shows an enlarged view of AC impedance spectroscopy in high frequency region. The AC impedance spectroscopy does not change significantly before and after 1000 cycles. This further indicates that $Bi_2S_3$/CNT nanocomposite has good cycling stability.

FIG. 8 is the schematic diagram of preparing a multi-layered ($Bi_2S_3$/CNT)/rGO capacitor electrode; in which:

1) a substrate (preferably conductive material) is firstly selected, and the $Bi_2S_3$/CNT is coated onto the substrate and dried;

2) electrochemical deposition is performed in graphene oxide solution to adsorb graphene oxide onto the $Bi_2S_3$/CNT film obtained in step 1);

3) cyclic voltammetry is utilized to reduce graphene oxide adsorbed on the $Bi_2S_3$/CNT film in step 2) to rGO in a saturated KCl solution, which is then taken out and drying;

4) a product is obtained by repeating steps 1)-3) for a number of times (preferably repeating 1-10 times; in the repeating process of step 1), $Bi_2S_3$/CNT is coated onto the surface of rGO obtained from the previous cycle).

FIG. 9 shows the SEM images of $Bi_2S_3$/CNT and multi-layered ($Bi_2S_3$/CNT)/rGO capacitor electrode in Example 1, in which:

a-c are the SEM images of the $Bi_2S_3$/CNT nanocomposite electrode under various magnification;

d is the SEM image of the multi-layered ($Bi_2S_3$/CNT)/rGO electrode; in which the chart inserted is a partial enlarged SEM view;

e is the SEM image of the cross-section of multi-layered ($Bi_2S_3$/CNT)/rGO electrode;

f is the EDS spectrum of $Bi_2S_3$/CNT nanocomposite electrode.

FIG. 10 shows the three-electrode system electrochemical characterization of various layered ($Bi_2S_3$/CNT)/rGO capacitor electrode in Example 1-5 and six-layered $Bi_2S_3$/CNT electrode in comparative Example 5, in which a shows the cyclic voltammetry curves of ($Bi_2S_3$/CNT)/rGO capacitor electrode with one (1), two (2), four (4), six (6), and eight (8) layer(s) at a scan rate of 50 mV/s. It can be seen that the current increases with the increasing of the layer number, indicating that the multi-layered structure and inserted rGO layers will increase the specific surface area and conductivity of the electrode.

b shows the charging-discharging curves of ($Bi_2S_3$/CNT)/rGO capacitor electrode with one (1), two (2), four (4), six (6), and eight (8) layer(s) at a current density of 22 A/g. The discharge plateau in the discharging curve of the electrode gradually decreases with the increasing of the layer number, and a typical double-layer capacitance characteristic is exhibited when the layer number is six (6).

c shows the cyclic voltammetry curves of six (6)-layered ($Bi_2S_3$/CNT)/rGO and six (6)-layered $Bi_2S_3$/CNT capacitor electrode at a scan rate of 50 mV/s. ($Bi_2S_3$/CNT)/rGO electrode exhibits rectangle like cyclic voltammetry curve after inserted with rGO, i.e., typical capacitive characteristic.

d shows the charging-discharging curves of six (6)-layered ($Bi_2S_3$/CNT)/rGO capacitor electrode and six (6)-layered $Bi_2S_3$/CNT capacitor electrode at a current density of 22 A/g, indicating that insertion of rGO layer(s) can perfectly convert the electrode material from battery type to capacitance type.

FIG. 11 shows the comparison of power density and energy density of multi-layered ($Bi_2S_3$/CNT)/rGO capacitor electrode, in which:

a shows the power density-energy density diagram of ($Bi_2S_3$/CNT)/rGO capacitor electrode with one (1), two (2), four (4), six (6), and eight (8) layer(s). With the increasing of the layer number, the energy density gradually decreases and the power density gradually increases, i.e., electrode converting from battery type to capacitance type.

b shows the comparison of power density and energy density between ($Bi_2S_3$/CNT)/rGO capacitor electrode with one (1), two (2), four (4), six (6), and eight (8) layer(s) and existing energy storage device. It is clear that ($Bi_2S_3$/CNT)/rGO capacitor electrode possesses high energy density and power density, which is superior to existing supercapacitor and lithium ion battery (lithium primary battery)

The above measurements and results show that, in the Examples, the $Bi_2S_3$/CNT nanocomposite prepared through hydrothermal method is a good battery type electrode material. And then a capacitive multi-layered ($Bi_2S_3$/CNT)/rGO electrode is prepared through many times of electrochemical deposition and electrochemical reduction on a $Bi_2S_3$/CNT film. This capacitive multi-layered ($Bi_2S_3$/CNT)/rGO electrode possesses high power density, high energy density, high specific capacitance, and excellent cycling stability (in a three-electrode system, utilizing 0.5 mol/L $Na_2ClO_4$ solution as electrolyte, the new battery type supercapacitor electrode material achieves a specific capacitance of 3568 F/g, an energy density of 460 Wh/kg, a power density of 22802 W/kg, and a 90% capacitance retention after $1000^{th}$ cycle). However, in the Comparative Examples, the specific capacitance, power density and energy density of various materials are relatively low.

It should be noted that, although the results show that the most preferred mass ratio of $Bi_2S_3$/CNT nanocomposite is 1:2, the most preferred layer number of ($Bi_2S_3$/CNT)/rGO electrode is six (6); other mass ratio of $Bi_2S_3$/CNT nanocomposite and other layer number of ($Bi_2S_3$/CNT)/rGO electrode can also achieve good results. In the present invention, the preparation and processing parameters of $Bi_2S_3$/CNT nanocomposite can be parameters for processing other similar battery type materials, and the preparation parameters can also be adjusted accordingly in a certain range. The method for preparing and processing multi-layered ($Bi_2S_3$/CNT)/rGO electrode can also be used to process other similarly structured capacitor electrode. Furthermore, the preparation method is not limited to electrochemical deposition, and the raw materials used are not limited to GO, other capacitive materials with good conductivity can also be used. In addition, the substrate to support the multilayered structure is definitely not limited to glass carbon, which can be printed carbon cloths, metal films, metal meshes, etc.

It should be further noted that, electron transfer and ion transmission are closely related to the power density of the material, and the energy density of the material is proportional to the specific capacitance and the square of absolute value of the potential window. Thus, the skilled artisan will understand that other high specific energy battery material and/or supercapacitor material such as metal oxides, metal hydroxides, metal sulfides, conductive polymers or carbon materials, especially, manganese oxide, cobalt oxide, iron oxide, ruthenium oxide, molybdenum oxide, tungsten oxide, titanium oxide, manganese molybdenum oxide, cobalt molybdenum oxide, nickel cobalt oxide, cobalt manganese oxide, vanadium phosphate oxide, cobalt hydroxide, nickel hydroxide, manganese hydroxide, bismuth sulfide, molybdenum sulfide, nickel sulfide, iron sulfide, tin sulfide, cadmium sulfide, lead sulfide, gallium sulfide, polypyrrole, polyaniline, poly-3,4-ethylene dioxythiophene, polythiophene, graphene, graphene hydrosol, graphene aerosol, three dimensional graphene, carbon nanotube, activated carbon, biomass carbon, carbon cloth, can also be used in the present invention, due to their characteristics of high specific surface, high theoretical capacity, good conductivity, wide potential window and stability. In addition, the electrolyte can be solid, gel or/and non-aqueous electrolyte to improve the mass-manufacturing capability and to further improve the energy density by increasing the window potential.

The above preferred embodiments are only for illustrating the present invention, and not for limiting purpose. Although detailed description has been given in connection with above preferred embodiments, it is understood to skilled artisan that various modification can be made, without departing from the scope of the appended claims.

The invention claimed is:

1. A multi-layer based new conceptual battery type supercapacitor with high power density and high energy density, comprising a multi-layer-structured electrode, an electrolyte, a current collector or named as substrate and a housing, wherein: the multi-layer-structured electrode is formed by alternately stacking or laminating thin layers of high specific energy battery material and/or supercapacitor material and reduced graphene oxide film, wherein: the high specific energy battery material and/or the supercapacitor material is $Bi_2S_3$ and CNT, and the multi-layer-structured electrode is a multi-layered ($Bi_2S_3$/CNT)/rGO electrode.

2. The supercapacitor according to claim 1, wherein: $Bi_2S_3$/CNT layers and rGO layers are alternately stacked or laminated in the multi-layered ($Bi_2S_3$/CNT)/rGO electrode, and the layer number of both $Bi_2S_3$/CNT layers and rGO layers are 2100.

3. The supercapacitor according to claim 1 or 2, wherein: the layer thickness of the $Bi_2S_3$/CNT layer and rGO layer ranges in 1-50 um and 2-500 nm, respectively.

4. A method for preparing the multi-layer based new conceptual battery type supercapacitor with high power density and high energy density according to claim 1, comprising:
1) coating $Bi_2S_3$/CNT on a substrate and drying;
2) electrochemical depositing graphene oxide onto the $Bi_2S_3$/CNT film obtained in step 1) in a graphene oxide solution;
3) reducing the graphene oxide adsorbed on the $Bi_2S_3$/CNT film in step 2) to rGO with cyclic voltammetry in a KCl solution, and then taking out and drying;
4) repeating steps 1)-3) several times to obtain a multi-thin layered supercapacitor electrode;
5) assembling the supercapacitor by using the supercapacitor electrodes obtained in step 4).

5. The method for preparing the multi-layer based new conceptual battery type supercapacitor with high power density and high energy density according to claim 4, wherein: the method further includes a step of preparing $Bi_2S_3$/CNT before coating $Bi_2S_3$/CNT, comprising: firstly, weighing $Bi(NO_3)_3 \cdot 5H_2O$, thioacetamide and CNT; then dissolving $Bi(NO_3)_3 \cdot 5H_2O$, thioacetamide and CNT in water; and, finally, placing the solution under 160-200° C. to react for 5-8 h to obtain $Bi_2S_3$/CNT nanocomposite.

6. The method for preparing the multi-layer based new conceptual battery type supercapacitor with high power density and high energy density according to claim 4, wherein: when coating $Bi_2S_3$/CNT on the substrate in step 1), $Bi_2S_3$/CNT is firstly dissolved in Nafion ethanol solution; then, the Nafion ethanol solution containing $Bi_2S_3$/CNT is deposited onto a surface of a substrate by electrochemical deposition, dropping, spin coating, screen printing, dip coating or brush coating; wherein the mass concentration of $Bi_2S_3$/CNT is 0.05-0.15 mg/mL, and the volume ratio of Nafion and ethanol is 1:10-1:50.

7. The method for preparing the multi-layer based new conceptual battery type supercapacitor with high power density and high energy density according to claim 4, wherein: when performing electrochemical deposition in step 2), the $Bi_2S_3$/CNT film obtained in step 1) is used as a working electrode, a platinum electrode is used as counter electrode, a saturated calomel electrode is used as reference electrode, and graphene oxide solution is electrolyte.

8. The method for preparing the multi-layer based new conceptual battery type supercapacitor with high power density and high energy density according to claim 7, wherein: potentiostatic method with a deposition potential of 2.0-3.0 V and a deposition time of 50-100 s is utilized to deposit graphene oxide, and the concentration of graphene oxide is 0.3-0.8 mg/mL.

9. The method for preparing the multi-layer based new conceptual battery type supercapacitor with high power density and high energy density according to claim 4, wherein: when reducing graphene oxide with cyclic voltammetry in step 3), the scan rate is 40-60 mV/s, the potential window is −1.1~−0.2 V, and the cycling number is 2-5 cycles.

* * * * *